United States Patent [19]

Firth et al.

[11] 3,708,334
[45] Jan. 2, 1973

[54] METHOD OF MARKING THE SKIN OR FUR OF ANIMALS

[75] Inventors: Jay A. Firth, Overland Park, Kans. 66212; John A. Frump, Terre Haute, Ind. 47802

[73] Assignee: Commercial Solvents Corp.

[22] Filed: March 22, 1971

[21] Appl. No.: 126,872

Related U.S. Application Data

[62] Division of Ser. No. 845,559, July 28, 1969, abandoned.

[52] U.S. Cl. ............... 117/141, 117/3, 117/142, 8/54, 106/22, 106/23, 252/8.57
[51] Int. Cl. ............................................. D06m 3/02
[58] Field of Search ......... 117/142, 3, 141; 252/8.57; 106/22, 23, 20, 19; 8/54

[56] References Cited

UNITED STATES PATENTS

| | | | |
|---|---|---|---|
| 2,372,410 | 3/1945 | Tryon | 260/307 F |
| 2,831,858 | 4/1958 | de Benneville et al. | 252/8.57 X |
| 3,336,145 | 8/1967 | Purcell | 106/176 |
| 3,519,608 | 7/1970 | Kelley | 117/142 X |

*Primary Examiner*—William D. Martin
*Assistant Examiner*—Theodore G. Davis
*Attorney*—Howard E. Post and Robert H. Dewey

[57] ABSTRACT

A durable marking composition especially suitable for marking the skin of animals, consisting essentially of 4,4-bis(hydroxymethyl)-2-alkyl or alkenyl-2-oxazoline and a color body.

3 Claims, No Drawings

METHOD OF MARKING THE SKIN OR FUR OF ANIMALS

This application is a division of U.S. Ser. No. 845,559 filed July 28, 1969 and now abandoned.

BACKGROUND OF THE INVENTION

This invention relates to a durable marking composition. In a particular aspect, this invention relates to a durable marking composition especially suitable for marking the skin of animals.

It is frequently necessary and desirable to place an identifying mark on inanimate or animate objects, such as the skin or fur of animals, with a durable marking composition which is resistant to removal by abrasion, exposure to water, or, in the case of animals, to the natural flow of perspiration and skin oils. Previously, non-permanent marking of the skin of animals and hydrophilic inanimate surfaces has been effected by the use of wax crayons containing dyes or pigments or by application of inks, e.g. a solution or suspension of a dye or pigment in a liquid medium with other adjuncts which serve to prolong the durability of the marking composition. Such compositions have been satisfactory for short term use, especially for laboratory animals, but for long-term use or for outdoor exposure, it has been necessary to renew the mark frequently. This not only takes valuable time by the technician but there is the added disadvantage of possible irreparable loss of identification. Accordingly a need exists for a more durable marking composition.

SUMMARY OF THE INVENTION

It is an object of this invention to provide a durable marking composition.

It is another object of this invention to provide a durable marking composition especially suitable for marking the skin or fur of animals.

It is yet another object of this invention to provide a durable marking composition suitable for use on hydrophilic surfaces.

Other objects will be apparent to those skilled in the art from the disclosure herein.

It has been discovered that marking compositions formulated with a color body, an oxazoline vehicle corresponding to the formula

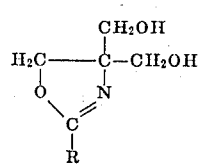

where R is alkyl or alkenyl of from 11 to 19 carbon atoms and, when preferred, an auxiliary vehicle are exceptionally durable. The composition is suitable for use when cast in the form of a crayon or as an ink when dispersed in a suitable liquid medium.

DETAILED DISCUSSION

The oxazolines useful in the practice of this invention are well known compounds, some of which are commercially available. The commercial materials are generally suitable. They can be prepared according to the method disclosed by R. F. Purcell, U. S. Pat. No. 3,336,145, by the condensation of tris(hydroxymethyl) aminomethane with an equi-molar proportion of a fatty acid corresponding to the formula RCOOH where R has the same meaning as hereinbefore set forth or mixtures thereof. Suitable oxazolines include, but are not limited to, those prepared from vegetable and animal fatty acids such as coconut oil fatty acids, palm oil fatty acids, linseed oil fatty acids, stearic acid and fish oil acids. The preferred oxazoline is obtained from commercial grade oleic acid where R is principally heptadecenyl.

The oxazoline can be used as the sole vehicle or it can be mixed with other known vehicles which are denoted herein as auxiliary vehicles. The auxiliary vehicles are especially useful when the oxazoline is a low-melting solid or a liquid so that the crayons lack the desired mechanical strength. Also the auxiliary vehicles are generally less expensive than the oxazoline and tend to reduce the costs of the compositions. Such auxiliary vehicles include natural vegetable waxes, e.g. carnauba and palm wax, and petroleum-derived waxes, e.g. high molecular weight paraffins and micro-crystalline waxes, and polymerized tall oil, all of which are well-known in the art. Suitable vehicles also include ester amides. The oxazolines are broadly compatible with waxes and any of the waxes of the prior art are useful. Generally the high-molecular weight paraffin waxes are preferred.

The ester amides useful as auxiliary vehicles in the composition of the present invention are known in the art and were described by P. F. Tryon, U. S. Pat. No. 2,372,410. They are conveniently prepared by reacting an alkanolamine with a mono- or dibasic carboxylic acid. The preferred ester amides are prepared by reacting 2-amino-2-methyl-1-propanol with a saturated or unsaturated monocarboxylic fatty acid having from 12 to 20 carbon atoms in a 1:2 molar ratio and heating under controlled conditions until 2 molar equivalents of water have been eliminated. Suitable fatty acids include coconut oil fatty acids, palm oil acids, linseed oil acids, oleic acid, stearic acid, and fish oil acids including mixtures thereof.

Ester amides prepared from dibasic carboxylic acid are also suitable for the practice of this invention. These compounds are obtained by reacting the alkanolamine with a dibasic acid in a molar ratio of about 1:1 and heating until about 2 moles of water are eliminated. A mixture of compounds is probably obtained thereby, including polymeric compounds of varying molecular weights. Suitable acids include oxalic, malonic, succinic, glutaric, adipic, pimelic, suberic, azelaic, and sebacic. The ester amide prepared from 2-amino-2-methyl-1-propanol and adipic acid is particularly preferred.

Color bodies suitable for use in the present invention can be any of the pigments and dyes known to the prior art. When the composition is intended for use on human or animal skin the pigment should be free from adverse dermatological effects and may be selected from those known to the be suitable. Examples of suitable pigments include, but are not limited to, carbon black, red iron oxide, titanium dioxide and the like. Dyes which can be used include, but are not limited to, dyes generally recognized as safe for use in foods and cosmetics, such as gentian violet. Many such dyes are known to those skilled in the art. When the composition is intended for use on non-living objects, any pigment or dye can be used.

Generally the crayon-type compositions of the present invention correspond to the following:

| Oxazoline | 20–60% by wt. |
|---|---|
| Extender | 0–45 |
| Pigment | 15–40 |

The above is formed into a crayon, or pencil, by melting with gentle agitation, e.g. stirring, pouring into a mold and cooling. These compositions are opaque.

Because of their generally intense color, dyes are usually used in much lower proportions than pigments, i.e. of the order of 1–5 percent. Substitution of a dye for a pigment gives a crayon which leaves a substantially transparent mark. Unless the dye is very stable, however, it may be bleached in strong sunlight. The dye composition can be used as an ink by dissolving in a suitable solvent, such as ethanol, isopropyl alcohol, butanol, ethylene glycol or monoethers thereof. Many suitable solvents are known in the art. In the preparation of inks, the auxiliary vehicle, if any, is selected so that it is soluble in the solvent.

The compositions of the present invention are suitable for marking any object exposed to ambient temperatures, but it is contemplated that they are especially useful for marking animals. The crayon-type is used as one would use a pencil. The ink can be applied by brush or by a stamp or any suitable method, many of which are known to those skilled in the art.

EXAMPLE 1

The following ingredients were charged to a mixing kettle:

| Ingredient | Parts by Wt. |
|---|---|
| 2-heptadecenyl-4,4-bis(hydroxy-methyl)-2-oxazoline | 40 |
| Red iron oxide pigment | 40 |
| Paraffin Wax | 20 |

Heat was applied to heat the contents to about 50°–70 °C whereupon the oxazoline and paraffin wax melted. Mild agitation was used to form a suspension of the pigment in the melt and the molten mixture was then poured into a mold to form a crayon. After cooling, the crayon was removed from the mold.

The oxazoline was Alkaterge-T, manufactured by Commercial Solvents Corporation from commercial grade oleic acid. The iron oxide pigment was Kroma Red RO-5097, manufactured by Chas. Pfizer & Co., Brooklyn, New York. The paraffin wax was "Gulfwax," manufactured by the Gulf Oil Corporation.

The crayon so produced was used to mark cattle. After 4 weeks' exposure in the open, the mark was still legible.

EXAMPLE 2

The experiment of Example 1 was repeated except that the following ingredients were used:

| Ingredient | Parts by Wt. |
|---|---|
| Alkaterge-T | 15 |
| Red iron oxide | 30 |
| Paraffin | 25 |
| Ester amide | 30 |

The ester amide was the reaction product of 2-amino-2-methyl-1-propanol with adipic acid.

EXAMPLE 3

The experiment of Example 1 was repeated except that the following ingredients were used:

| Ingredient | Parts by Wt. |
|---|---|
| Alkaterge-T | 40 |
| Yellow pigment | 40 |
| Paraffin wax | 20 |

The pigment was Chrome Yellow Y-469-D, manufactured by E. I. du Pont de Nemours, Inc., Wilmington Delaware. The resulting crayon is an effective marking pencil on hydrophilic surfaces.

EXAMPLE 4

The experiment of Example 3 was repeated except that the proportions of ingredients were: Alkaterge-T, 53.6 parts; pigment, 26.4 parts; paraffin wax, 20.0 parts.

EXAMPLE 5

The experiment of Example 3 was repeated except that the following ingredients were used:

| Ingredient | Parts by Wt. |
|---|---|
| Alkaterge-T | 36.9 |
| Chrome yellow | 18.1 |
| Paraffin wax | 40.0 |
| Polymerized Tall Oil | 5.0 |

The polymerized tall oil was Emtall-664, manufactured by Emery Industries, Inc., Cincinnati, Ohio

EXAMPLE 6

An ink is prepared by dissolving 10 g of 2-hepdadecyl-4,4-hydroxymethyl-2-oxazoline (Wax Ts-254AA, Commercial Solvents Corporation, New York 10017, N.Y.) in 90 g of ethyl alcohol and adding 1 g of gentian violet dye.

EXAMPLE 7

A transparent crayon is prepared according to the procedure of Example 1 except gentian violet, 1 part by weight, is substituted for the iron oxide pigment.

EXAMPLE 8

The experiment of Example 7 is repeated except that 95 parts by weight of oxazoline are employed in place of the oxazoline and paraffin combination.

We claim:

1. A method for durably marking the skin or fur of animals with a marking composition formulated with a dye or pigment and a durable vehicle, said method comprising using as said vehicle, or portion thereof, a 2-alkyl or alkenyl-4,4-bis(hydroxymethyl)-2-oxazoline in an amount of at least 20 percent by weight of said composition, said alkyl or alkenyl being a hydrocarbon group having from 11 to 19 carbon atoms and applying said composition to said skin or fur.

2. The method of claim 1 wherein said oxazoline is used as the entire said vehicle.

3. The method of claim 1 wherein the said oxazoline is 2-heptadecenyl-4,4-bis-(hydroxymethyl)-2-oxazoline.

* * * * *